US009678574B2

(12) United States Patent
Mongia et al.

(10) Patent No.: US 9,678,574 B2
(45) Date of Patent: Jun. 13, 2017

(54) COMPUTING SYSTEM UTILIZING THREE-DIMENSIONAL MANIPULATION COMMAND GESTURES

(75) Inventors: Rajiv Mongia, Fremont, CA (US); Achintya Bhowmik, Cupertino, CA (US); Mark Yahiro, Santa Clara, CA (US); Dana Krieger, Emeryville, CA (US); Ed Mangum, San Mateo, CA (US); Diana Povieng, San Francisco, CA (US)

(73) Assignee: Intel Corporation, Santa Clara, CA (US)

(*) Notice: Subject to any disclaimer, the term of this patent is extended or adjusted under 35 U.S.C. 154(b) by 453 days.

(21) Appl. No.: 13/997,639

(22) PCT Filed: Dec. 23, 2011

(86) PCT No.: PCT/US2011/067287
§ 371 (c)(1),
(2), (4) Date: Jun. 24, 2013

(87) PCT Pub. No.: WO2013/095677
PCT Pub. Date: Jun. 27, 2013

(65) Prior Publication Data
US 2014/0089866 A1    Mar. 27, 2014

(51) Int. Cl.
*G06F 3/00*        (2006.01)
*G06F 3/048*       (2013.01)
(Continued)

(52) U.S. Cl.
CPC ............ *G06F 3/017* (2013.01); *G06F 3/0484* (2013.01); *G06F 2203/04806* (2013.01); *G06F 2203/04808* (2013.01)

(58) Field of Classification Search
CPC ................................ G06F 3/017; G06F 3/005
See application file for complete search history.

(56) References Cited

U.S. PATENT DOCUMENTS 5,581,670 A    12/1996  Bier
5,594,469 A *  1/1997   Freeman ............... G05B 19/106
                                                345/157
(Continued)

FOREIGN PATENT DOCUMENTS

CA    2768893       2/2011
TW     393629       6/2000
(Continued)

OTHER PUBLICATIONS

Office Action including Search Report, dated Sep. 23, 2014 (+ English translation), in Taiwan Patent Application No. 101146399, 19 pages.
(Continued)

*Primary Examiner* — Yongjia Pan
(74) *Attorney, Agent, or Firm* — Blakely, Sokoloff, Taylor & Zafman LLP

(57) ABSTRACT

A computing system utilizing three-dimensional manipulation command gestures. An embodiment of an apparatus includes a sensing element to sense a presence or movement of a user of the apparatus, a processor, wherein operation of the processor includes interpretation of command gestures of the user to provide input to the apparatus, and a display screen to provide a display. The command gestures include one or more command gestures to manipulate at least a portion of the display, the one or more command gestures being gestures including motion along an axis between the display screen and the user.

20 Claims, 10 Drawing Sheets

(51) Int. Cl.
*G06F 3/01* (2006.01)
*G06F 3/0484* (2013.01)

(56) References Cited

U.S. PATENT DOCUMENTS

| | | | |
|---|---|---|---|
| 6,222,465 B1 | 4/2001 | Kumar et al. | |
| 7,030,861 B1* | 4/2006 | Westerman et al. | 345/173 |
| 7,274,803 B1 | 9/2007 | Sharma et al. | |
| 7,519,223 B2* | 4/2009 | Dehlin et al. | 382/203 |
| 7,598,942 B2* | 10/2009 | Underkoffler | G06F 3/017 |
| | | | 345/158 |
| 7,849,421 B2 | 12/2010 | Yoo et al. | |
| 7,924,271 B2* | 4/2011 | Christie et al. | 345/173 |
| 8,181,123 B2* | 5/2012 | Stone-Perez et al. | 715/863 |
| 8,333,661 B2* | 12/2012 | Ng | A63F 13/10 |
| | | | 463/31 |
| 8,334,842 B2* | 12/2012 | Markovic | G06F 3/017 |
| | | | 345/158 |
| 8,448,083 B1* | 5/2013 | Migos et al. | 715/781 |
| 8,693,724 B2 | 4/2014 | Ahmed et al. | |
| 8,830,227 B2* | 9/2014 | Rais | G06T 7/0057 |
| | | | 345/419 |
| 8,982,182 B2* | 3/2015 | Shpunt | G06F 3/005 |
| | | | 348/42 |
| 9,002,099 B2* | 4/2015 | Litvak | G06K 9/00382 |
| | | | 345/653 |
| 9,098,931 B2* | 8/2015 | Shpunt | G01B 11/2518 |
| 9,171,200 B2* | 10/2015 | Subramanian | G06F 3/011 |
| 9,189,825 B2* | 11/2015 | Im | G06T 1/0007 |
| 2002/0064382 A1* | 5/2002 | Hildreth et al. | 396/100 |
| 2003/0076293 A1* | 4/2003 | Mattsson | G06F 3/017 |
| | | | 345/156 |
| 2005/0003851 A1* | 1/2005 | Chrysochoos et al. | 455/550.1 |
| 2006/0026521 A1 | 2/2006 | Hotelling et al. | |
| 2006/0031786 A1* | 2/2006 | Hillis | G06F 3/04883 |
| | | | 715/863 |
| 2006/0036944 A1* | 2/2006 | Wilson | 715/702 |
| 2006/0132432 A1 | 6/2006 | Bell | |
| 2006/0187196 A1* | 8/2006 | Underkoffler et al. | 345/156 |
| 2006/0209021 A1 | 9/2006 | Yoo et al. | |
| 2008/0005703 A1 | 1/2008 | Radivojevic | |
| 2008/0036732 A1 | 2/2008 | Wilson et al. | |
| 2008/0052643 A1 | 2/2008 | Ike et al. | |
| 2008/0120577 A1 | 5/2008 | Ma et al. | |
| 2008/0231926 A1* | 9/2008 | Klug et al. | 359/23 |
| 2009/0217211 A1* | 8/2009 | Hildreth et al. | 715/863 |
| 2010/0031202 A1* | 2/2010 | Morris et al. | 715/863 |
| 2010/0031203 A1* | 2/2010 | Morris et al. | 715/863 |
| 2010/0045705 A1 | 2/2010 | Vertegaal et al. | |
| 2010/0060722 A1* | 3/2010 | Bell | G06F 3/017 |
| | | | 348/51 |
| 2010/0199232 A1* | 8/2010 | Mistry et al. | 715/863 |
| 2010/0280988 A1* | 11/2010 | Underkoffler et al. | 706/58 |
| 2010/0281436 A1* | 11/2010 | Kipman et al. | 715/863 |
| 2010/0281437 A1* | 11/2010 | Stone-Perez et al. | 715/863 |
| 2010/0303289 A1* | 12/2010 | Polzin | A63F 13/06 |
| | | | 382/103 |
| 2011/0102570 A1 | 5/2011 | Wilf et al. | |
| 2011/0115702 A1 | 5/2011 | Seaberg | |
| 2011/0119640 A1* | 5/2011 | Berkes | G06F 3/011 |
| | | | 715/863 |
| 2011/0197263 A1 | 8/2011 | Stinson, III | |
| 2011/0219340 A1 | 9/2011 | Pathangay et al. | |
| 2011/0221669 A1* | 9/2011 | Shams et al. | 345/156 |
| 2011/0258537 A1* | 10/2011 | Rives et al. | 715/255 |
| 2011/0283212 A1 | 11/2011 | Warner | |
| 2011/0289455 A1 | 11/2011 | Reville et al. | |
| 2011/0296353 A1 | 12/2011 | Ahmed et al. | |
| 2012/0051588 A1* | 3/2012 | McEldowney | G03B 17/54 |
| | | | 382/103 |
| 2012/0084688 A1* | 4/2012 | Robert et al. | 715/769 |
| 2012/0119988 A1 | 5/2012 | Izumi | |
| 2012/0169670 A1 | 7/2012 | Kim et al. | |
| 2012/0235903 A1 | 9/2012 | Im | |
| 2012/0249741 A1 | 10/2012 | Maciocci et al. | |
| 2013/0106898 A1 | 5/2013 | Saint-Loubert-Biè et al. | |
| 2013/0154919 A1 | 6/2013 | Tan et al. | |

FOREIGN PATENT DOCUMENTS

| | | |
|---|---|---|
| TW | m294069 | 7/2006 |
| TW | 201037577 | 10/2010 |
| TW | 201120681 | 6/2011 |
| TW | 201137766 | 11/2011 |
| WO | WO-20110066343 | 3/2011 |
| WO | WO-2011/066343 | 6/2011 |

OTHER PUBLICATIONS

Office Action mailed Dec. 5, 2014, in U.S. Appl. No. 13/997,978, 6 pages.
Official Letter dated Jul. 28, 2014 (+ English translation), in R.O.C. (Taiwanese) Patent Application No. 101149340, 13 pages.
International Search Report and Written Opinion of the International Searching Authority mailed Aug. 28, 2012, in International Patent Application No. PCT/US2011/067280, 10 pages.
International Search Report and Written Opinion of the International Searching Authority mailed Aug. 28, 2012, in International Patent Application No. PCT/US2011/067287, 10 pages.
International Search Report and Written Opinion of the International Searching Authority mailed Aug. 28, 2012, in International Patent Application No. PCT/US2011/067289, 10 pages.
International Search Report and Written Opinion of the International Searching Authority mailed Aug. 28, 2012, in International Patent Application No. PCT/US2011/067290, 10 pages.
Notice of Allowance mailed Mar. 30, 2015, in U.S. Appl. No. 13/997,978, 7 pages.
Office Action dated Feb. 24, 2015 (+ English translation), in Taiwan Patent Application No. 101147201, 15 pages.
Office Action mailed Mar. 27, 2015, in U.S. Appl. No. 13/997,640, 17 pages.
Official Letter dated Mar. 2, 2015 (+ English translation), in Taiwan Patent Application No. 101145913, 16 pages.
Decision of Rejection dated Jun. 16, 2015 (+ English translation), in Taiwan Patent Application No. 101147201, 8 pages.
Extended European Search Report dated Jul. 22, 2015, in European Patent Application No. 11878127.7, 6 pages.
Final Office Action mailed Jul. 21, 2015, in U.S. Appl. No. 13/997,640, 19 pages.
Notice of Allowance mailed Jul. 22, 2015, in U.S. Appl. No. 13/997,978, 8 pages.
Office Action mailed Jun. 18, 2015, in U.S. Appl. No. 13/997,634, 12 pages.
Office Action mailed Jan. 4, 2016, in U.S. Appl. No. 13/997,634, 14 pages.
Allowance Decision and Search Report (+ Search Report in English Translation) in Taiwanese Patent Application No. 101147201 mailed Jun. 26, 2016, 4 pages.
Office Action for U.S. Appl. No. 13/997,640, mailed Apr. 22, 2016, 13 pages.
Second Office Action for U.S. Appl. No. 13/997,634 mailed Apr. 19, 2016, 15 pages.
Notice of Allowance for U.S. Appl. No. 13/997,634 mailed Aug. 16, 2016, 7 pages.
Final Office Action for U.S. Appl. No. 13/997,640, mailed Aug. 10, 2016, 14 pages.
Advisory Action for U.S. Appl. No, 13/997,640 mailed Nov. 4, 2016, 9 pgs.
Notice of Allowance (+ English Translation) for Taiwanese Application No. 101149340 mailed Nov. 27, 2014, 3 pages.
International Preliminary Report on Patentability for International Patent Application No. PCT/US2011/067280 mailed Jul. 3, 2014, 7 pages.
International Preliminary Report on Patentability for International Patent Application No. PCT/US2011/067287 mailed Jul. 3, 2014, 7 pages.

(56) References Cited

OTHER PUBLICATIONS

International Preliminary Report on Patentability for International Patent Application No. PCT/US2011/067289 mailed Jul. 3, 2014, 7 pages.
International Preliminary Report on Patentability for International Patent Application No. PCT/US2011/067290 mailed Jul. 3, 2014, 7 pages.
Notice of Allowance (+ English Translation) in Taiwanese Patent Application No. 101224916 mailed Oct. 22, 2013, 4 pages.
Notice of Alowance in Taiwan Applicaton No. 101146399 mailed Jun. 5, 2015, 2 pages.

* cited by examiner

COMPUTING SYSTEM UTILIZING THREE-DIMENSIONAL MANIPULATION COMMAND GESTURES

CROSS-REFERENCE TO RELATED APPLICATION

This application is a national phase of PCT/US2011/067287 filed Dec. 23, 2011, which application is incorporated herein by reference in its entirety.

TECHNICAL FIELD

Embodiments of the invention generally relate to the field of computing systems and, more particularly, to a computing system utilizing three-dimensional manipulation command gestures.

BACKGROUND

Computing systems and related systems are being developed to provide a more natural interface for users. In particular, computing systems may include sensing of a user of the computing system, where user sensing may include gesture recognition, where the system attempts to recognize one or more command gestures of a user, and in particular hand gestures of the user.

Within a computing system, a user may be required to manipulate a display screen of the computer system, or to manipulate elements that are represented by various icons or other symbols on the display screen of the computer system.

However, the manipulation of a display screen or symbols on a display screen is not a natural task or operation for a user. A conventional computing system handles such operations using a combination of elements such as mouse and screen menus, which are awkward and unnatural concepts for a person operating in the natural world, as opposed to the virtual space of the computing system.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
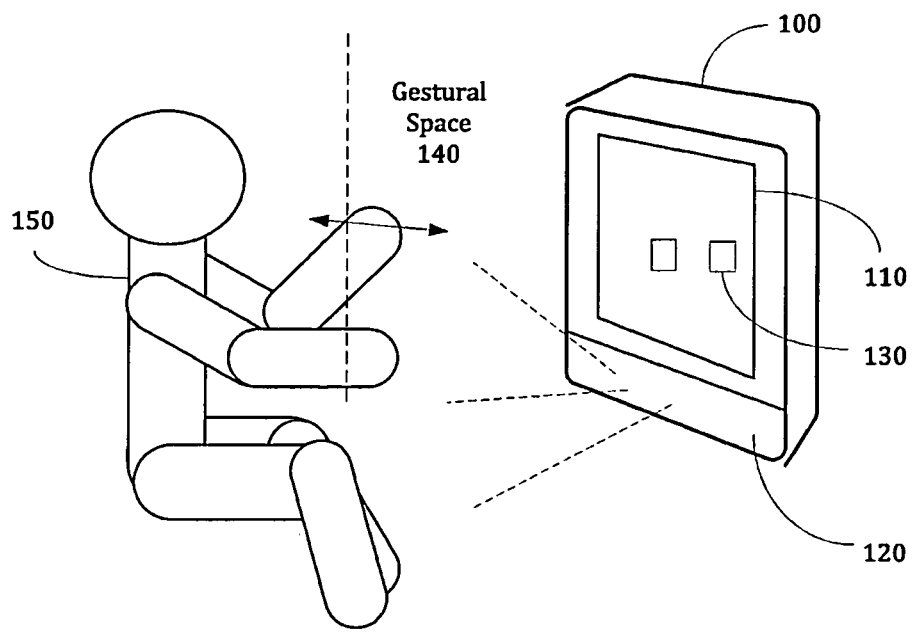
FIG. 1 illustrates an embodiment of a computing system including a mechanism to for sensing three-dimensional manipulation command gestures.

Embodiments of the invention are generally directed to a computing system utilizing three-dimensional manipulation command gestures.

As used herein:

"User sensing" means a computer operation to sense a user. The sensing of a user may include position and motion detection, such as a computing system detecting and interpreting gestures made by a user of the computing system as inputs to the computing system. User sensing may utilize any-technology by which the user may be sensed by the computing, including visual sensing (using one or more cameras or similar devices), audio sensing (including detection of sounds and detection of sound reflection), heat or infrared sensing, sensing and interpretation of projected light patterns (visible or invisible), and other technologies. User sensing may include operations of a perceptual computing system in sensing user operations and intent, where a perceptual computing system is a system allowing for the addition of alternative input modalities, including gesture recognition.

"Computing system" means any device or system that includes computing capability. A computing system includes both a single unit and a system of multiple elements. A computing system is not limited to a general-purpose computer, but also includes special purpose devices that include computing capability. A computing system may include a mobile computing device, including a laptop computer, a tablet computer, a smartphone, or other mobile device. A "computing system" includes a desktop computer, a game console, a laptop or notebook computer, an all-in-one (AIO) computer, a tablet computer, a handheld computing device including a smart phone, or other apparatus or system having computing and display capability.

In some embodiments, in a computing system utilizing user sensing to detect system inputs, gestures made by a user to communicate with the computing system (which may be referred to generally as command gestures) may include three-dimensional (3D) manipulation command gestures. In some embodiments, the 3D manipulation command gestures may be recognized by the computing system as inputs by a user of the system to manipulate contents of a display screen or to manipulate icons or other symbols that are displayed on the display screen.

A provided herein, movement towards or away from the computing system may be referred to as motion along the Z-axis, as opposed to movement in the X-axis (horizontal or side to side in relation to the computing system) and movement in the Y-axis (vertical or up and down in relation to the computing system). In some embodiments, a computing system allows a user to use natural and intuitive command gestures in the X, Y, and Z-axes to manipulate symbols seen by the user on the display screen. In some embodiments, gestures move in and out of a gestural space that exists within a certain range of the computing system. In some embodiments, the computing system responds to such command gestures by performing functions relating to the gestures and icons or other symbols shown on a display screen. In some embodiments, "Entry" and "Exit" to a gestural space of a computer system is determined by, for example, sensing when a user moves a hand of the user toward and away from the screen respectively.

In some embodiments, a computing system, including a perceptual computing device, includes a mechanism for 3D manipulation command gestures. In some embodiments, the mechanism provides for selecting, opening, previewing, and moving applications, apps, files, or other content within the system using intuitive command gestures in three dimensions for such actions.

This disclosure describes certain command gestures (referred to herein as 3D manipulation command gestures) that can be utilized within a computing system in order to allow a user to manipulate a display screen or icons or symbols displayed to the user on a display screen. In some embodiments, visual feedback is provided to a user either through perspective/parallax within a 2D screen or by changing the distances/orientation/depth when utilizing a 3D screen.

An embodiment of an apparatus includes a sensing element to sense a presence or movement of a user of the apparatus, a processor, wherein operation of the processor includes interpretation of command gestures of the user to provide input to the apparatus, and a display screen to provide a display. The command gestures include one or more command gestures to manipulate at least a portion of the display, the one or more command gestures being gestures including motion along an axis between the display screen and the user.

In some embodiments, a method includes detecting a presence of a user in a sensing range of a computing system; displaying and image for the user on a display screen; detecting a command gesture of the user in relation to the display screen or an icon displayed on the display screen, wherein the command gesture including motion along an axis between the display screen and the user; and interpreting the command gesture as an operation to manipulate the display screen or a displayed icon.

FIG. 1 illustrates an embodiment of a computing system a mechanism to for sensing three-dimensional manipulation command gestures. In some embodiments, a computing system 100 includes a display screen to 110 to provide feedback to a user 150 regarding command gestures being performed by the user, including display of certain icons and other symbols 130. In some embodiments, the computing system 100 including one or more sensing elements 120 to sense position and movement of the user 150. Sensing elements may include multiple different elements working together, working in sequence, or both. For example, sensing elements may include elements that provide initial sensing, such as light or sound projection, following by sensing for gesture detection by, for example, an ultrasonic time of flight camera or a patterned light camera.

In particular, the sensing elements 120 may detect movement and position of the hand or hands of the user. In some embodiments, the computing system 100 senses whether command gestures occur within a gestural space 140, where the gestural space 140 may be an area within a virtual boundary in relation to the computing system. The gestural space 140 may alternatively be an area within a virtual boundary in relation to the position of the user's body or head. In some embodiments, the computing system 100 provides for recognition of manipulation command gestures in three dimensions, where a 3D manipulation command gesture, including motion in the Z-axis towards or away from the display screen, may include a gesture that operates in the gestural space 140.

Figure 2:
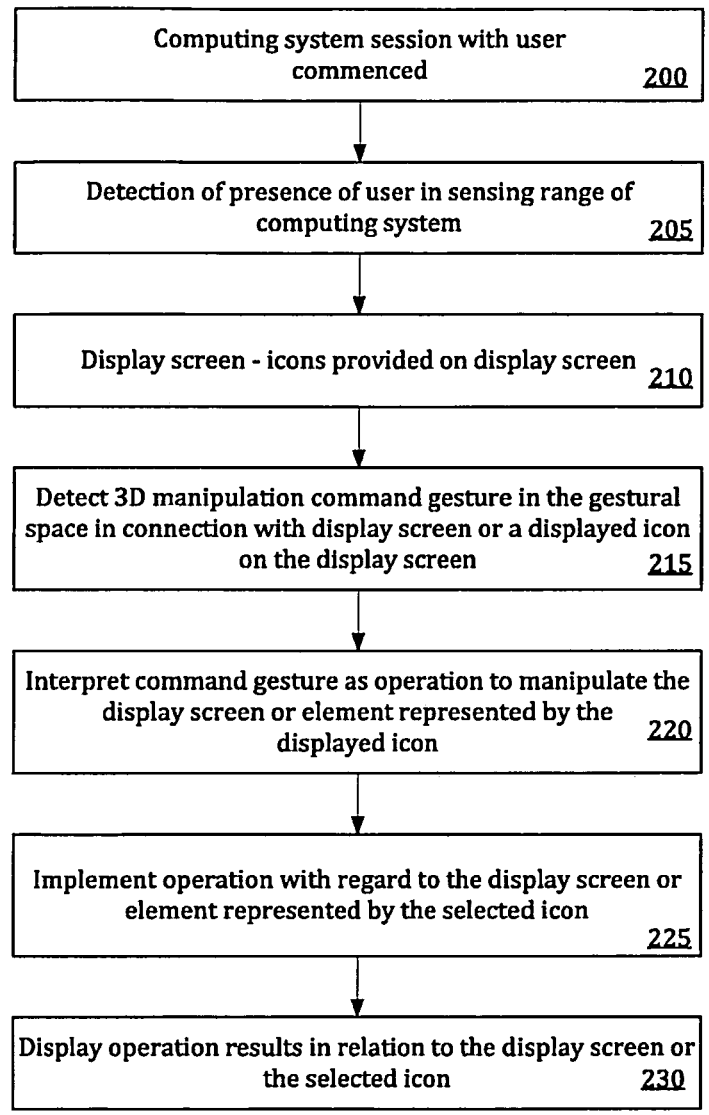
FIG. 2 is a flowchart to illustrate an embodiment of a process for handling three dimensional command gestures.

FIG. 2 is a flowchart to illustrate an embodiment of a process for handling three dimensional command gestures. In some embodiments, upon a computing system commencing a session with a user 200 and the computing system detecting a presence of the user within a sensing range of the computing system 205 (where being in sensing range includes being in range of the computing system viewing, hearing, or otherwise sensing the user), the computing system including a display screen that may display images, including icons or other symbols 210. In some embodiments, the computing system may detect a 3D manipulation command gesture in a gestural space of the computing system, where the command gesture may relate to the display screen or to one or more displayed icons on the display screen 215. In some embodiments, the command gesture may include but is not limited to a command gesture illustrated in FIGS. 3-8 to manipulate the display screen or manipulate an element represented by an icon on the display screen.

In some embodiments, the computing system interprets the command gesture as an operation to manipulate the display or an element represented by a selected icon 220 and implements the operation with regard to the display or the element represented by the icon 225. In some embodiments, the computing system provides appropriate operation results on the display screen in relation to the display screen or the selected icon 230. The results may include a change in the display screen, such as a rotation, panning, or zooming of the display, or a selected icon, such as moving, previewing, opening, executing, launching, copying, deleting, or other such action regarding an element represented by a displayed icon.

Figure 3:
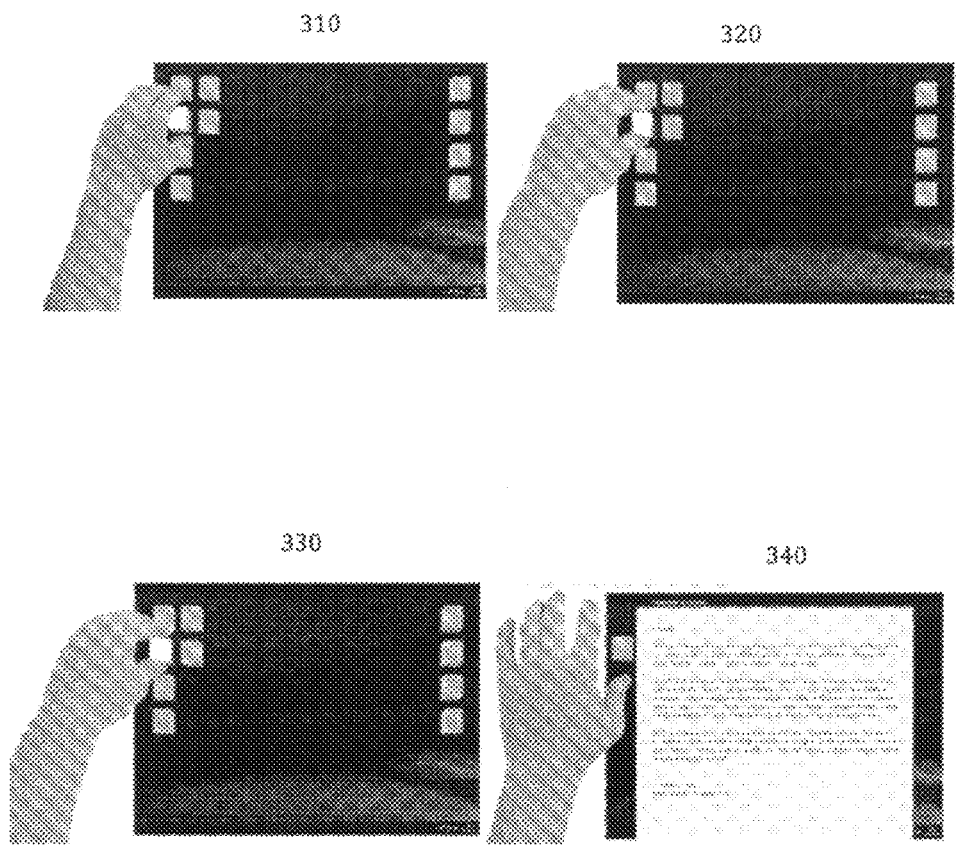
FIG. 3 is an illustration of an embodiment of a computing system utilizing a grasping command gesture.

FIG. 3 is an illustration of an embodiment of a computing system utilizing a grasping command gesture. In some embodiments, a basic command gesture is a "Claw" or grasping hand gesture, which may be formed by a user forming a "C" shape using the thumb and one or more other fingers of one hand. In this illustration, a user forms a claw-hand command gesture in the gestural space of a computing system to command a certain operation. In some embodiments, as a user moves the user's hand in a region sensed by the computing system, a Claw icon is displayed and moves across the display screen to provide real-time feedback location. In some embodiments, when the Claw-icon moves over an icon representing an app, application, file, or other item on the screen 310, the icon is highlighted and moves toward the Claw-icon (using 3D depth of view or 2D perspective) to provide confirmation to the user 320.

In some embodiments, if a desired icon is highlighted and is within the Claw-icon, the user can either squeeze or close the user's Claw-hand in order to confirm that the user is selecting that particular icon 330, or may cancel the selection by, for example, moving the Claw-hand away from the selected icon. In some embodiments, if upon selection, the user moves the user's hand parallel or roughly parallel to the display screen, the selected icon may be moved around the display screen to new locations. If the user then opens the Claw-hand, the icon will move to the new desired location.

In some embodiments, alternatively, when in the new desired location, the user may move the user's Claw-hand gesture toward the screen and then opens the Claw-hand, thereby completing the motion. In some embodiments, if the user releases the Claw-hand gesture without moving toward the screen, this may indicate that the user is cancelling the move or other action regarding the icon.

In some embodiments, if upon selection of an icon the user moves the user's hand away (further along the Z-axis) from the display screen of the computing system, the icon is previewed, such as showing the user information regarding or contents of the icon. In some embodiments, this operation may be utilized in a circumstance in which the user wants to obtain more information to sort, but does not yet want to open the icon file. In some embodiments, if while the Claw-hand is moved away from the screen (with the icon being previewed), the user opens the user's Claw-hand, the command gesture indicates that the user wants to "Open" the icon file 340.

In some embodiments, alternatively, movement of the Claw-hand away from the screen may indicate that the user would like to move the icon to a new location on the screen. In some embodiments, alternatively, if the user turns the Claw-hand to the side, then the user takes a "peak" at the File that has been selected (preview pane). Alternatively, in some embodiments a preview may be achieved by the user turning the Claw-hand away from the display screen and toward the user.

Figure 4:
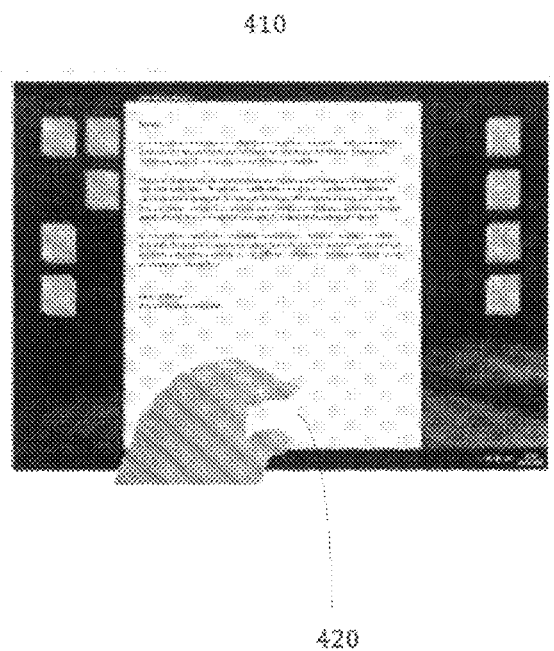
FIG. 4 is an illustration of an embodiment of a computing system utilizing a grasping command gesture.

FIG. 4 is an illustration of an embodiment of a computing system utilizing a grasping command gesture. In some embodiments, if a user drags an icon representing a file (through movement of the user's closed-Claw-hand, such as illustrated in FIG. 3) to a predetermined section of the display screen, then opens the user's Claw-hand, the command gesture indicates that the user has dropped the icon representing a file into, for example, an "Open Bin" box. The "Open Bin" box can be indicated by an outlined box on the screen or as an abstract icon such as a projector, movie screen, pen/paper, scroll, paint pallet, easel, door, window, or other symbol. For example, illustration 410 shows a user dropping an icon 420 into a location for opening the file represented by the icon.

Figure 5:
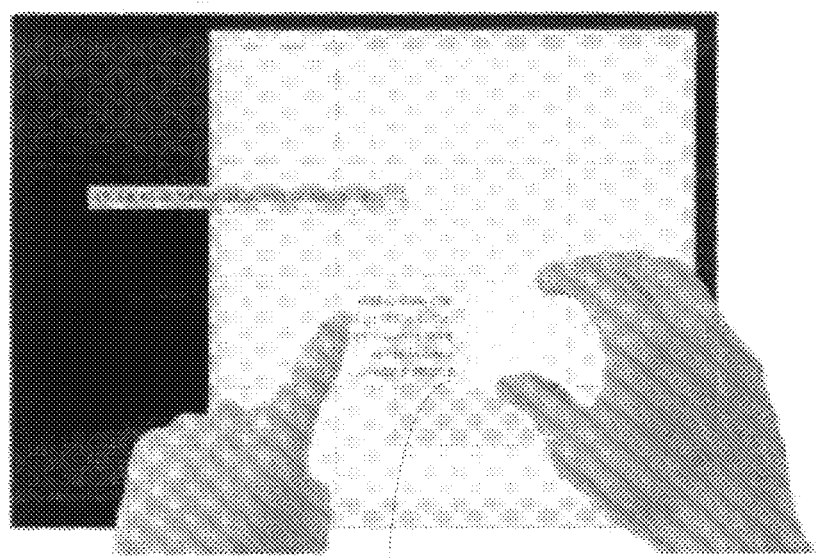
FIGS. 5 and 6 are illustrations of operations of an embodiment of a system providing displays to allow action to be taken with regard to a selected icon.
Figure 6:
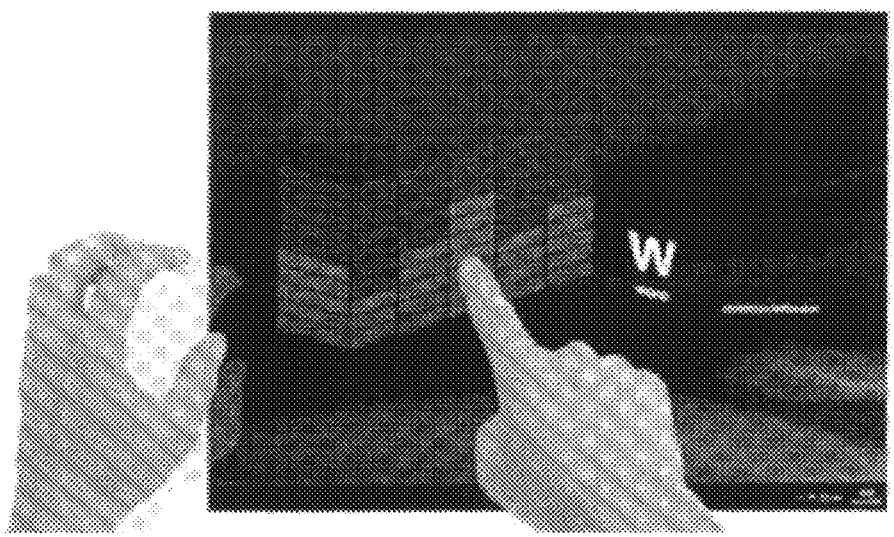

FIGS. 5 and 6 are illustrations of operations of an embodiment of a system providing displays to allow action to be taken with regard to a selected icon. In FIG. 5, in some embodiments, when a "Preview" of an icon is generated 510 (such as when the Claw-hand command gesture of the user is turned away from the screen or is lifted from the screen), a portion of the selected screen may be highlighted or selected by use of the second hand. In some embodiments, a user may provide a command gesture by pointing at the selection on the screen that is desired 520, or can be done by use of a second Claw-hand in order to grab the content from the previewed element. This content may include, for example, an address, phone number, email address, hyperlink, photo, video, or other data connected with the selected icon. In FIG. 6, in some embodiments, other input actions related to a previewed file of a selected icon may be made, such as adjusting levels of a graph or diagram 610.

Figure 7:
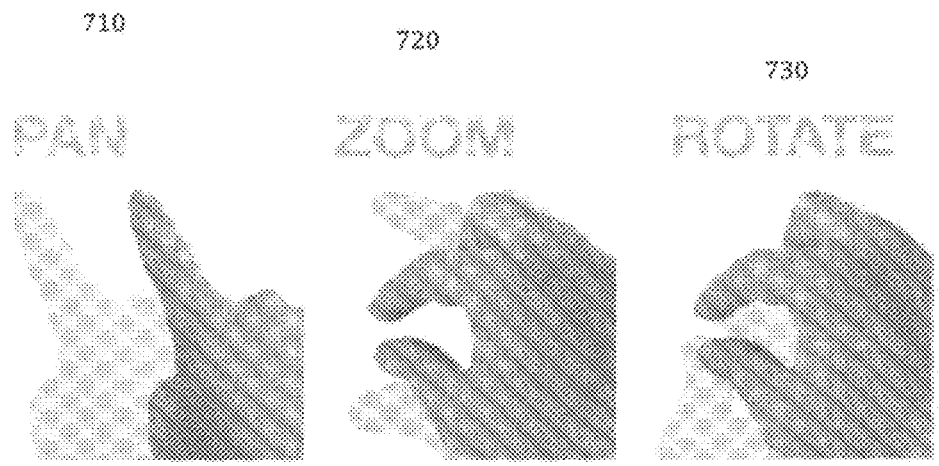
FIG. 7 is an illustration of operations of an embodiment of a system providing for manipulation of a display screen.

FIG. 7 is an illustration of operations of an embodiment of a system providing for manipulation of a display screen. In some embodiments, "Entry" and "Exit" to a gestural space of a computer is determined by noting when a user moves their hand toward and away from the screen respectively. In some embodiments, the movement toward and away from the display screen may distinguish between a "rest" in a command gesture and a "hold and continue" in a command gesture. For example, if a user intends to zoom in multiple times, the user may make a zoom gesture (such as by spreading the fingers of a hand, such as the thumb and one or more other fingers of the hand), then move the user's hand away from the display screen, reset the hand (such as by placing the thumb and one or more other fingers of the hand together), move the hand back towards the screen, and make a second zoom gesture. In some embodiments, these operations may be used to provide a series of operations, such as in this case being two zoom operations.

In some embodiments, 3D manipulation command gestures may include:

Pan 710: In some embodiments, moving a finger toward the display screen (movement along the Z-axis into the gestural space) enters the computing system into a pan function, followed by a movement in the X or Y-axes to pan the content of the display screen. In some embodiments, moving the finger away from the screen (out of the gestural space) is command gesture to exit from the pan function. In some embodiments, alternatively, two or more fingers being held up and toward the screen may also-be utilized as a Pan feature, where directing two or more fingers towards the display screen causes the computing system to enter into a pan function and moving the hand away from the display screen causes the computing system to exit the pan function. In some embodiments, alternatively, an open palm being held up and toward the screen may also be utilized as a Pan feature, where directing the open palm towards the display screen causes the computing system to enter into a pan function and moving the hand away from the display screen causes the computing system to exit the pan function.

Zoom 720: In some embodiments, moving a thumb and one or more fingers in contact together into the gestural space results in entering a zoom function, where if the thumb and another finger are moved apart, then a "Zoom-in" is the response. In some embodiments, if the thumb and the other finger are kept apart and the hand leaves the gesture space, then the computing system exits the zoom function and the zoom-in result remains. If while in the gesture space, the thumb and other finger are moved back toward each other, then a "Zoom-out" effect is provided by the computing system. In some embodiments, only the thumb and index finger are in contact. In other embodiments, other fingers are used with the thumb.

Rotate 730: In some embodiments, a computing system may detect an open, cupped hand entering into the gestural space, causing the computing system to enter into a rotate function. Once in the gestural space, the rotation of the open, cupped hand represents rotation of the contents of the display screen. Remaining in the gestural space, the open/cupped hand will cause rotations back and forth as the hand is rotated in the clockwise and counterclockwise directions. In some embodiments, if after rotation the open/cupped hand is moved out of the gestural space (away from the display screen along the Z-axis), causing the computing system to exit the rotate function. In some embodiments, the hand of the user may be re-set and then re-enter the gestural space of the computing system, thereby allowing a further rotation beyond what a hand can do in one motion.

In some embodiments, the manipulation command gestures may be used in sequence to perform a sequence of operations. For example, a gesture of a single finger moved towards the screen to enter a pan function, performance of the panning, and removed to exit the pan function; followed by a gesture of a thumb and finger together moved towards the display screen to enter a zoom function, performance of the zoom operation (of already panned display), and removed to exit the zoom function; and followed by a gesture of a cupped hand moved toward the display screen to enter a rotate function, performance of the rotate operation (of already panned and zoomed display), and removed to exit the rotate function.

Figure 8:
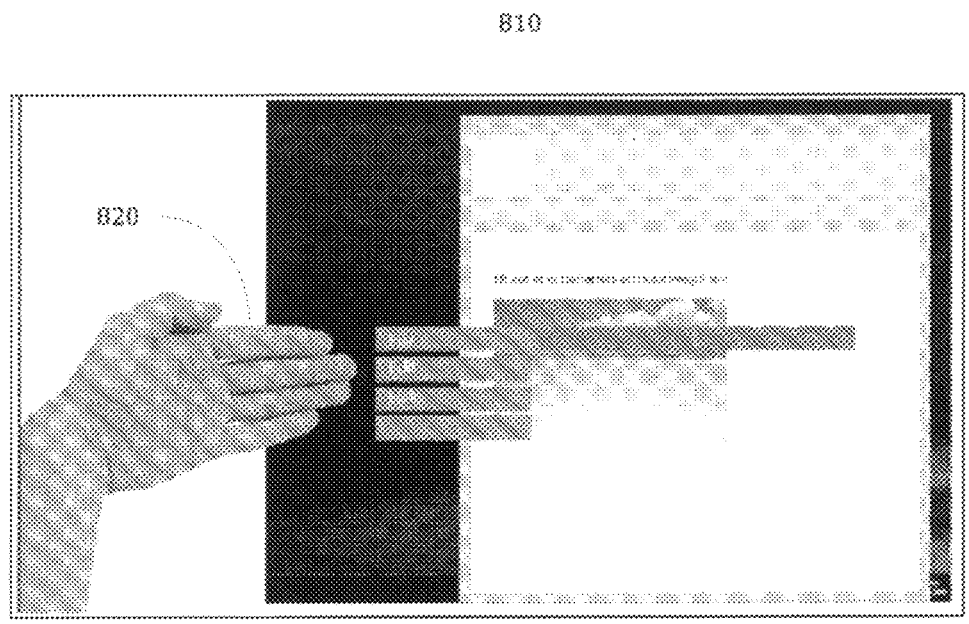
FIG. 8 is an illustration of operations of an embodiment of a system providing for manipulation of a display screen.

FIG. 8 is an illustration of operations of an embodiment of a system providing for manipulation of a display screen. In this illustration, an additional command gesture for a menu is illustrated. In some embodiments, a command gesture 810 may include movement of a flat hand that is initially roughly perpendicular to the display screen, such that the hand is roughly parallel to the display screen 820, turning a palm of a flat hand toward the user (analogous to looking at the palm of the hand). In some embodiments, the movement of the hand towards the user results in an operation to open a menu, where the user may choose a menu item by, for example, a gesture using the other hand of the user. In some embodiments, returning the flat hand to a posture that is perpendicular to the display screen may result in closing the displayed menu.

Figure 9:
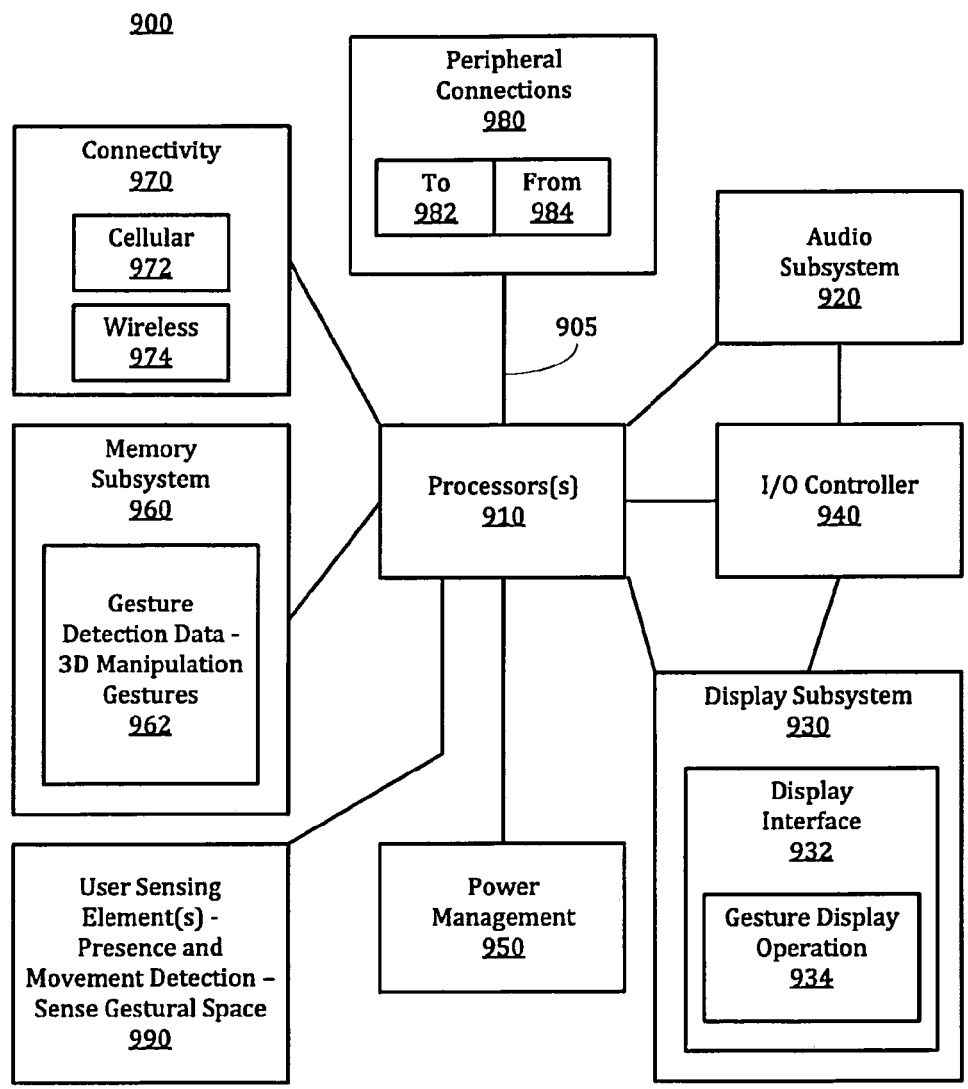
FIG. 9 is a block diagram to illustrate an embodiment a computing system including a mechanism for utilizing three-dimensional command gestures.

FIG. 9 is a block diagram to illustrate an embodiment a computing system including a mechanism for utilizing three-dimensional command gestures. Computing system 900 represents any computing device or system utilizing user sensing, including a mobile computing device, such as a laptop computer, computing tablet, a mobile phone or smartphone, a wireless-enabled e-reader, or other wireless mobile device. It will be understood that certain of the components are shown generally, and not all components of such a computing system are shown in computing system 900. The components may be connected by one or more buses or other connections 905.

Computing system 900 includes processor 910, which performs the primary processing operations of computing system 900. Processor 910 can include one or more physical devices, such as microprocessors, application processors, microcontrollers, programmable logic devices, or other processing means. The processing operations performed by processor 910 include the execution of an operating platform or operating system on which applications, device functions, or both are executed. The processing operations include, for example, operations related to I/O (input/output) with a human user or with other devices, operations related to power management, and operations related to connecting computing system 900 to another system or device. The processing operations may also include operations related to audio I/O, display I/O, or both. Processors 910 may include one or more graphics processing units (GPUs), including a GPU used for general-purpose computing on graphics processing units (GPGPU).

In, some embodiments, computing system 900 includes audio subsystem 920, which represents hardware (such as audio hardware and audio circuits) and software (such as drivers and codecs) components associated with providing audio functions to the computing system. Audio functions can include speaker output, headphone output, or both, as well as microphone input. Devices for such functions can be integrated into computing system 900, or connected to computing system 900. In some embodiments, a user interacts with computing system 900 by providing audio commands that are received and processed by processor 910.

Display subsystem 930 represents hardware (for example, display devices) and software (for example, drivers) components that provide a visual display, a tactile display, or combination of displays for a user to interact with the computing system 900. Display subsystem 930 includes display interface 932, which includes the particular screen or hardware device used to provide a display to a user. In one embodiment, display interface 932 includes logic separate from processor 910 to perform at least some processing related to the display. In one embodiment, display subsystem 930 includes a touchscreen device that provides both output and input to a user. In some embodiments, the display interface 932 includes a gesture display operation 934, where such operation includes display of operations for 3D manipulation command gestures to manipulate the display screen or icons on the display screen.

I/O controller 940 represents hardware devices and software components related to interaction with a user. I/O controller 940 can operate to manage hardware that is part of audio subsystem 920 and hardware that is part of the display subsystem 930. Additionally, I/O controller 940 illustrates a connection point for additional devices that connect to computing system 900 through which a user might interact with the system. For example, devices that can be attached to computing system 900 might include microphone devices, speaker or stereo systems, video systems or other display device, keyboard or keypad devices, or other I/O devices for use with specific applications such as card readers or other devices.

As mentioned above, I/O controller 940 can interact with audio subsystem 920, display subsystem 930, or both. For example, input through a microphone or other audio device can provide input or commands for one or more applications or functions of computing system 900. Additionally, audio output can be provided instead of or in addition to display output. In another example, if display subsystem includes a touchscreen, the display device also acts as an input device, which can be at least partially managed by I/O controller 940. There can also be additional buttons or switches on computing system 900 to provide I/O functions managed by I/O controller 940.

In one embodiment, I/O controller 940 manages devices such as accelerometers, cameras, light sensors or other environmental sensors, or other hardware that can be included in computing system 900. The input can be part of direct user interaction, as well as providing environmental input to the system to influence its operations (such as filtering for noise, adjusting displays for brightness detection, applying a flash for a camera, or other features).

In one embodiment, computing system 900 includes power management 950 that manages battery power usage, charging of the battery, and features related to power saving operation.

Memory subsystem 960 includes memory devices for storing information in computing system 900. Memory can include nonvolatile (state does not change if power to the memory device is interrupted) memory devices and volatile (state is indeterminate if power to the memory device is interrupted) memory devices. Memory 960 can store application data, user data, music, photos, documents, or other data, as well as system data (whether long-term or temporary) related to the execution of the applications and functions of system 900. In particular, memory may include gesture detection data 962 for use in detecting and interpreting gestures by a user of the computing system 900, where the gesture detection data includes data for the detection of 3D manipulation command gestures for the manipulation of the contents of the display screen or icons provided on the display screen.

In some embodiments, computing system 900 includes one or more user sensing elements 990 to sense presence and motion, wherein may include one or more cameras or other visual sensing elements, one or more microphones or other audio sensing elements, one or more infrared or other heat sensing elements, or any other element for sensing the presence or movement of a user. In some embodiments, the user sensing elements include capability of sensing whether a gesture has occurred within a gestural space that is within a virtual boundary of the computing system.

Connectivity 970 includes hardware devices (such as wireless and wired connectors and communication hardware) and software components (such as drivers and protocol stacks) to enable computing system 900 to communicate with external devices. The computing system could include separate devices, such as other computing devices, wireless access points or base stations, as well as peripherals such as headsets, printers, or other devices.

In some embodiments, connectivity 970 can include multiple different types of connectivity. To generalize, computing system 900 is illustrated with cellular connectivity 972 and wireless connectivity 974. Cellular connectivity 972 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Cellular connectivity includes 4G/LTE technology. Wireless connectivity 974 refers to wireless connectivity that is not cellular, and can include personal area networks (such as Bluetooth), local area networks (such as Wi-Fi), wide area networks (such as WiMax), or other wireless communication. Connectivity 970 may include an omnidirectional or directional antenna for transmission of data, reception of data, or both.

Peripheral connections 980 include hardware interfaces and connectors, as well as software components (for example, drivers and protocol stacks) to make peripheral connections. It will be understood that computing system 900 could both be a peripheral device ("to" 982) to other computing devices, as well as have peripheral devices ("from" 984) connected to it. Computing system 900 commonly has a "docking" connector to connect to other computing devices for purposes such as managing (such as downloading, uploading, changing, and synchronizing) content on computing system 900. Additionally, a docking connector can allow computing system 900 to connect to certain peripherals that allow computing system 900 to control content output, for example, to audiovisual or other systems.

In addition to a proprietary docking connector or other proprietary connection hardware, computing system 900 can make peripheral connections 980 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Figure 10:
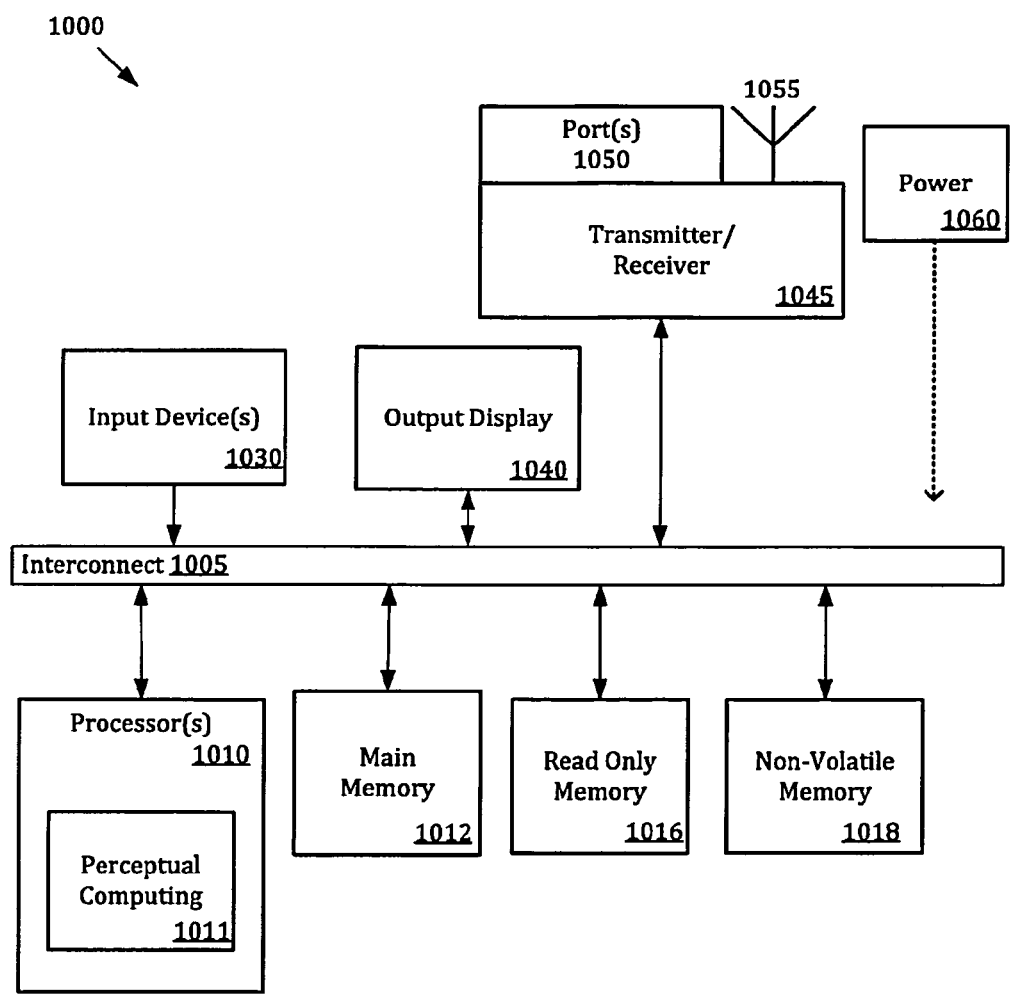
FIG. 10 illustrates an embodiment of a computing system for perceptual computing.

FIG. 10 illustrates an embodiment of a computing system for perceptual computing. The computing system may include a computer, server, game console, or other computing apparatus. In this illustration, certain standard and well-known components that are not germane to the present description are not shown. Under some embodiments, the computing system 1000 comprises an interconnect or crossbar 1005 or other communication means for transmission of data. The computing system 1000 may include a processing means such as one or more processors 1010 coupled with the interconnect 1005 for processing information. The processors 1010 may comprise one or more physical processors and one or more logical processors. The interconnect 1005 is illustrated as a single interconnect for simplicity, but may represent multiple different interconnects or buses and the component connections to such interconnects may vary. The interconnect 1005 shown in FIG. 10 is an abstraction that represents any one or more separate physical buses, point-to-point connections, or both connected by appropriate bridges, adapters, or controllers.

Processing by the one or more processors include processing for perceptual computing 1011, where such processing includes sensing and interpretation of gestures in relation to a virtual boundary of the computing system.

In some embodiments, the computing system 1000 further comprises a random access memory (RAM) or other dynamic storage device or element as a main memory 1012 for storing information and instructions to be executed by the processors 1010. RAM memory includes dynamic random access memory (DRAM), which requires refreshing of memory contents, and static random access memory (SRAM), which does not require refreshing contents, but at increased cost. In some embodiments, main memory may include active storage of applications including a browser application for using in network browsing activities by a user of the computing system. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory.

The computing system 1000 also may comprise a read only memory (ROM) 1016 or other static storage device for storing static information and instructions for the processors 1010. The computing system 1000 may include one or more non-volatile memory elements 1018 for the storage of certain elements.

In some embodiments, the computing system 1000 includes one or more input devices 1030, where the input devices include one or more of a keyboard, mouse, touch pad, voice command recognition, gesture recognition, or other device for providing an input to a computing system.

The computing system 1000 may also be coupled via the interconnect 1005 to an output display 1040. In some embodiments, the display 1040 may include a liquid crystal display (LCD) or any other display technology, for displaying information or content to a user. In some environments, the display 1040 may include a touch-screen that is also utilized as at least a part of an input device. In some environments, the display 1040 may be or may include an audio device, such as a speaker for providing audio information.

One or more transmitters or receivers 1045 may also be coupled to the interconnect 1005. In some embodiments, the computing system 1000 may include one or more ports 1050 for the reception or transmission of data. The computing system 1000 may further include one or more omnidirectional or directional antennas 1055 for the reception of data via radio signals.

The computing system 1000 may also comprise a power device or system 1060, which may comprise a power supply, a battery, a solar cell, a fuel cell, or other system or device for providing or generating power. The power provided by the power device or system 1060 may be distributed as required to elements of the computing system 1000.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
   a sensing element to sense a presence or movement of a user of the apparatus;
   a processor, wherein operation of the processor includes interpretation of command gestures using one or both hands of the user to provide input to the apparatus; and
   a display screen to provide a display;
   wherein the command gestures include one or more command gestures to manipulate at least a portion of the display, the one or more command gestures being gestures including motion of one hand or both hands of the user along an axis between the display screen and the user;
   wherein the apparatus is to define a gestural space for the apparatus, wherein an operation by the user includes a series of gestures, the gestures including a movement out of the gestural space followed by a movement back into the gestural space; and
   wherein the processor is to interpret movements of the user as follows:
     a movement of one or both hands of the user into the gestural space is interpreted as a command to enter a first function and perform the first function,
     a movement of one or both hands of the user out of the gestural space is interpreted as a command to exit the first function and rest operation of the first function, and
     a movement of one or both hands of the user back into the gestural space is interpreted as a command to continue performance of the first function, wherein continuing performance of the first function includes implementing a re-set of a position of a gesture by one or both hands of the user to continue the performance of the first function.

2. The apparatus of claim 1, wherein a first command gesture includes a gesture using one or both hands of the user to grasp an icon of the display.

3. The apparatus of claim 2, wherein the gesture of the user includes a thumb and one or more other fingers of a hand of the user forming a "C" shape.

4. The apparatus of claim 2, wherein the first command gesture further includes a motion to move the icon.

5. The apparatus of claim 2, wherein the first command gesture further includes a motion to preview an element represented by the icon.

6. The apparatus of claim 2, wherein the first command gesture further includes a motion to open an element represented by the icon.

7. The apparatus of claim 1, wherein a first command gesture includes a gesture using one or both hands of the user to manipulate the display.

8. The apparatus of claim 7, wherein the manipulation of the display includes one of panning the display, zooming into or out of the display, or rotating the display.

9. The apparatus of claim 1, wherein the re-set of the position of the gesture by the user is a change between a first position of one or both hands of the user during the movement out of gesture space and a second position of one or both hands of the user when re-entering into the gestural space.

10. A method comprising:
    detecting a presence of a user in a sensing range of a computing system;
    displaying an image for the user on a display screen;
    detecting a command gesture of the user in relation to the display screen or an icon displayed on the display screen, wherein the command gesture including motion of one hand or both hands of the user along an axis between the display screen and the user; and interpreting the command gesture as an operation to manipulate the display screen or a displayed icon:

wherein the computing system is to define a gestural space for the apparatus, wherein an operation by the user includes a series of gestures, the gestures including a movement out of the gestural space followed by a movement back into the gestural space; and wherein interpreting the command gesture includes:
  interpreting a movement of one or both hands of the user into the gestural space as a command to enter a first function and perform the first function,
  interpreting a movement of one or both hands of the user out of the gestural space as a command to exit the first function and rest operation of the first function, and
  interpreting a movement of one or both hands of the user back into the gestural space as a command to continue performance of the first function, wherein continuing performance of the first function includes implementing a re-set of a position of a gesture by one or both hands of the user to continue the performance of the first function.

11. The method of claim 10, wherein the command gesture is a gesture using one or both hands of the user to grasp an icon of the display.

12. The method of claim 11, wherein the gesture of the user includes a thumb and one or more other fingers of a hand of the user forming a "C" shape.

13. The method of claim 11, wherein the command gesture further includes a motion to move, preview, or open the icon.

14. The method of claim 10, wherein the command gesture includes a gesture using one or both hands of the user to manipulate the display.

15. The method of claim 14, wherein the manipulation of the display includes one of panning the display, zooming into or out of the display, or rotating the display.

16. The method of claim 10, wherein the re-set of the position of the gesture by the user is a change between a first position of one or both hands of the user during the movement out of gesture space and a second position of one or both hands of the user when re-entering into the gestural space.

17. A non-transitory computer-readable storage medium having stored thereon data representing sequences of instructions that, when executed by a processor, cause the processor to perform operations comprising:
  detecting a presence of a user in a sensing range of a computing system;
  displaying an image for the user on a display screen;
  detecting a command gesture of the user in relation to the display screen or an icon displayed on the display screen, wherein the command gesture including motion of one hand or both hands of the user along an axis between the display screen and the user; and
  interpreting the command gesture as an operation to manipulate the display screen or a displayed icon;
  wherein the computing system is to define a gestural space for the apparatus, wherein an operation by the user includes a series of gestures, the gestures including a movement out of the gestural space followed by a movement back into the gestural space; and
  wherein interpreting the command gesture includes:
    interpreting a movement of one or both hands of the user into the gestural space as a command to enter a first function and perform the first function,
    interpreting a movement of one or both hands of the user out of the gestural space as a command to exit the first function and rest operation of the first function, and
    interpreting a movement of one of both hands of the user back into the gestural space as a command to continue performance of the first function, wherein continuing performance of the first function includes implementing a re-set of a position of a gesture by one or both hands of the user to continue the performance of the first function.

18. The medium of claim 17, wherein the command gesture is a gesture using one or both hands of the user to grasp an icon of the display.

19. The medium of claim 17, wherein the command gesture includes a gesture using one or both hands of the user to manipulate the display.

20. The medium of claim 17, wherein the re-set of the position of the gesture by the user is a change between a first position of one or both hands of the user during the movement out of gesture space and a second position of one or both hands of the user when re-entering into the gestural space.

* * * * *